Patented July 3, 1928.

1,675,376

UNITED STATES PATENT OFFICE.

HARRY A. NOYES, OF SOUND BEACH, CONNECTICUT, ASSIGNOR TO TEXAS GULF SULPHUR COMPANY, OF BAY CITY, TEXAS, A CORPORATION OF TEXAS.

SULPHUR-BEARING ARTICLE.

No Drawing.  Application filed January 27, 1927. Serial No. 164,133.

This invention relates to articles composed in part of sulphur and has for its object the provision of certain improvements in such articles, and the provision of an improved method of making the same.

Various procedures have heretofore been used in making articles composed in part of sulphur. In accordance with one of these procedures, melted sulphur is mixed, in varying proportions, with suitable fillers. While at an elevated temperature these mixtures are more or less mobile or plastic and may be molded, cast or formed into desired shapes. Melted sulphur as well as sulphur in solution have also been used to impregnate or coat articles which already have the desired form or shape but which are lacking in some physical characteristic such as hardness, rigidity or strength. In such processes paper, cardboard, bindersboard, wood, concrete materials and the like, which have previously been formed into articles having desired shapes and forms, are subjected to the action of sulphur in any appropriate manner, such for example as immersion in molten sulphur. The sulphur fills up the interstitial spaces and congeals or crystallizes "in situ", thereby imparting certain desirable properties to the previously formed articles.

I have discovered that loose materials such as sand, sawdust, and the like may be appropriately shaped without the addition of a plasticizing agent or adhesive of any type, and subsequently bonded into articles by means of sulphur, in such a manner that the incoherent mass becomes a formed article through the agency of the sulphur alone. My present invention thus involves confining a mass of relatively small solid particles in a compact form in which the particles are held together solely by mechanical forces, and then introducing molten sulphur into the interstitial spaces of the compact mass of solid particles while so confined. The sulphur is permitted to congeal within the interstitial spaces of the compact mass of solid particles while still confined, and there results a solid rigid structure in which the particles are held together solely by the bonding action of the congealed sulphur. Ordinarily, the confining means will be removed from the resulting sulphur-impregnated article. Where the confining means may or is intended to form a part of the completed article, it need not be removed therefrom after the sulphur has congealed.

In practicing the invention, the relatively small particles of solid material, for example sawdust or wood flour, are fashioned into the desired shape with little or great pressure as the nature of the finished article demands. A forming mold is preferably used for handling and shaping the material. This mold may be made of steel, or any other suitable material, and may be perforated or not as the nature of the article requires. The material is thus compacted within the mold, of desired shape, and the small particles are held together in this compact form solely by the mechanical action of the forming mold. Molten sulphur is now introduced into the compact mass of solid particles and fills to a desired extent the interstitial spaces thereof. This introduction of molten sulphur may conveniently be effected by immersing the compact mass of solid particles, while confined as aforesaid, in a bath of molten sulphur for a sufficient length of time to secure the desired penetration of the molten sulphur through the interstices of the mass. The sulphur is now allowed to congeal within the interstices of the mass, and in so congealing bonds or cements the small particles together in a rigid and substantially monolithic structure. The forming mold may now be removed, and the resulting sulphur-impregnated article may be subjected to such further treatment as desired.

Substantially any finely divided material may be employed in practicing the invention. Thus, wood products, (such as wood flour, shavings, sawdust, slivers, small pieces of wood refuse, etc.), rags, papers, pulp products and other cellulosic materials, as well as sand, coke, and fillers in general, may be used. Such material may be used alone or in combination.

The forming mold in which the mass of small particles is compacted and confined during the impregnation with molten sulphur is provided with appropriate clamping or securing means for retaining the material in the desired shape within the mold throughout the impregnation with sulphur and the subsequent congealing or solidification of the sulphur. The mold may be perforated or may otherwise be of such construction as to permit the penetration of molten sulphur within the interstices of the compact mass in the mold without impairing or altering the physical shape of the mass as imparted thereto by the mold. The sulphur-impregnated article, when released from the mold, may be in finished form, or may be finished by grinding, sanding, buffing, polishing, painting, spraying, etc.

Articles of sawdust, wood flour, comminuted material, and the like, after being formed in a mold, without a binding agent, when removed from the mold will expand, disintegrate or fall apart completely. Treating the material while in the mold with sulphur, as hereinbefore described, changes the nature of the non-unitary mass and makes a rigid, coherent article. Thus, the first step of molding or shaping the finely divided material is simply to prepare the material so that sulphur may be combined therewith to make the article desired, either in the finished or rough state.

It is possible to press together sawdust in a press or mold so that it will appear to be a solid article of a certain size. This mass, however, is not in a true sense a solid article for upon releasing from the mold it expands, cracks, disintegrates and loses its shape with very slight handling. If, however, this mass is placed between forming plates of steel and these in turn are clamped so that the material retains its intended size and shape, it may be made into a true solid article by placing it in a bath of molten sulphur for a sufficient time, say several hours. If an attempt is made to form the article without confining the small particles of material in a mold or the like, so as to forcibly retain the mass of material in the desired shape, it will wholly or partially fall to pieces thus indicating that the pressed and shaped material was not a true solid article.

It will therefore be seen that the present invention differs from the impregnation with sulphur of a piece of cardboard, brick, wood or the like in such a way that the impregnation changes the properties of something that already exists as a true solid article. In other words, there is in the prior practice, an article to impregnate before the process is started. In the present invention there is nothing to start with but a mass of non-related particles held together by an external supporting wall and retained by some clamping device. In the finished article of the invention, the individual particles are held together solely by the cementing or bonding action of the sulphur. This article, as a rigid and permanent body, only comes into existence after the impregnation with sulphur and the subsequent solidification of the sulphur "in situ".

The loose particles when placed in the mold of desired shape may be subjected to a considerable pressure. With certain types of materials it has been found advantageous to use pressures of from one to several tons per square inch. This pressure which is used in the preliminary stage depends to some extent upon the nature of the material which has been place within the mold and to some extent upon the desired density of the finished product. After the mass has been shaped, the mold is clamped in place by any suitable means, so as to confine the mass of material in the desired configuration while the mold is immersed in a bath of molten sulphur.

The mold itself may be made in any desired form so as to allow the molten sulphur to penetrate into the confined mass. Thus in some cases, I have found it advantageous to use perforated metal molds and in other cases, it is advantageous to so space the upper and lower portions of the mold that there will be a slit or crack left between the two portions almost entirely surrounding the article and thus allowing for the entrance of the molten sulphur. Although these methods have given satisfactory results, I do not wish to confine myself thereto. The mold may, if desired, be made of material which is pervious to melted sulphur, and such material may in some instances be retained as a part of the finished article.

In the practice of the invention, I do not contemplate the use of any other binding agent to secure the particles one to another, aside from the sulphur itself. The action of the sulphur is purely one of a cementing agent binding the particles into a unitary or monolithic structure.

A great variety of useful articles may be manufactured by the invention, such as toilet seats, flower boxes, bathroom fixtures, mantle shelves, towel rolls, tiling, soap dishes and the like. Articles made in accordance with the invention possess a high degree of strength, hardness, firmness and unity. A wide choice of filler materials and other substances are available in practicing the invention.

I claim:

As a new article of manufacture, a rigid molded structure comprising a compact mass of relatively small particles of wood in which the particles are held together solely by the bonding action of congealed sulphur.

In testimony whereof I affix my signature.

HARRY A. NOYES.